US009182554B2

(12) United States Patent
Yashar et al.

(10) Patent No.: US 9,182,554 B2
(45) Date of Patent: Nov. 10, 2015

(54) OPTICAL CONNECTOR HAVING IMPROVED GUIDE PIN RETENTION

(71) Applicant: Avago Technologies General IP (Singapore) Pte. Ltd., Singapore (SG)

(72) Inventors: Frank D. Yashar, Cupertino, CA (US); Robert G. Ritter, Los Altos, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 45 days.

(21) Appl. No.: 14/091,407

(22) Filed: Nov. 27, 2013

(65) Prior Publication Data

US 2015/0147035 A1 May 28, 2015

(51) Int. Cl.
*G02B 6/36* (2006.01)
*G02B 6/38* (2006.01)

(52) U.S. Cl.
CPC .................. *G02B 6/3882* (2013.01)

(58) Field of Classification Search
CPC .... G02B 6/2492; G02B 6/3806; G02B 6/423; G02B 6/3882; B29D 11/0075
USPC .................. 385/78, 53, 52; 29/428
See application file for complete search history.

(56) References Cited

U.S. PATENT DOCUMENTS

| 4,830,456 | A | * | 5/1989 | Kakii et al. | 385/75 |
|---|---|---|---|---|---|
| 5,093,878 | A | * | 3/1992 | Haley et al. | 385/92 |
| 5,664,039 | A | * | 9/1997 | Grinderslev et al. | 385/65 |
| 6,048,106 | A | * | 4/2000 | Iwase | 385/88 |
| 6,676,301 | B2 | * | 1/2004 | Chan et al. | 385/83 |
| 6,767,141 | B1 | * | 7/2004 | Dudek et al. | 385/92 |
| 7,160,037 | B2 | * | 1/2007 | Dudek et al. | 385/92 |
| 7,331,721 | B2 | * | 2/2008 | Dudek et al. | 385/89 |
| 2003/0002819 | A1 | * | 1/2003 | Chan et al. | 385/83 |
| 2004/0028350 | A1 | * | 2/2004 | Gerdom et al. | 385/88 |
| 2004/0029481 | A1 | * | 2/2004 | Gross et al. | 445/23 |
| 2004/0228584 | A1 | * | 11/2004 | Dudek et al. | 385/89 |
| 2007/0110373 | A1 | * | 5/2007 | Dudek et al. | 385/89 |
| 2009/0052843 | A1 | * | 2/2009 | Cherel et al. | 385/59 |
| 2012/0281951 | A1 | | 11/2012 | Takahashi et al. | |
| 2013/0266268 | A1 | * | 10/2013 | Li et al. | 385/81 |
| 2014/0270653 | A1 | * | 9/2014 | McColloch | 385/88 |

FOREIGN PATENT DOCUMENTS

JP 06051161 A * 2/1994
JP 10048469 A * 2/1998

OTHER PUBLICATIONS

US Conec Product Catalog 2013/2014. Catalog [online]. US Conec Ltd., 2013 [retrieved on Oct. 22, 2013]. Retrieved from the Internet: <URL: http://www.usconec.com/LiteratureRetrieve.aspx?ID=152122>.
"Pin, Guide, Grooved, 11.4 SM/MM MT Elite". Product drawing [online]. US Conec Ltd., Apr. 23, 2003 [retrieved on Oct. 22, 2013]. Retrieved from the Internet: <URL: http://www.usconec.com/images/drawings/C10592.pdf>.

(Continued)

Primary Examiner — Peter Radkowski

(57) ABSTRACT

An optical connector includes a connector housing, a retaining plate, and two pins. The connector housing has two bores extending between rearward and forward ends of the connector housing. The retaining plate has a central opening with notches in two of its sides. Each pin extends through one of the notches, which engages the respective groove. The pins extend through the respective bores in the connector housing.

20 Claims, 8 Drawing Sheets

(56) References Cited

OTHER PUBLICATIONS

OE-TEK Incorporated. "Guide Pin" [online]. OE-TEK Inc., 2006 [retrieved on Oct. 22, 2013]. Retrieved from the Internet: <URL: http://www.oetek.com.tw/MPO_Series_MPO_Connector-03.html>.

"Guide Pin, MM". Product drawing [online]. OE-TEK Inc., Aug. 31, 2007 [retrieved on Oct. 22, 2013]. Retrieved from the Internet: <URL: http://www.oetek.com.tw/images/download/Giude_Pin_Multimode.pdf>.

* cited by examiner

OPTICAL CONNECTOR HAVING IMPROVED GUIDE PIN RETENTION

BACKGROUND

In an optical communication system, an optical transmitter can convert electrical signals that are modulated with information into optical signals for transmission via an optical fiber. An opto-electronic light source, such as a laser, performs the electrical-to-optical signal conversion in an optical transmitter. An optical receiver can receive the optical signals via the optical fiber and recover the information by demodulating the optical signals. An opto-electronic light detector, such as a photodiode, performs the optical-to-electrical signal conversion in an optical receiver. In addition to light sources and light detectors, opto-electronic transmitters and receivers commonly include lenses, reflectors and other optical elements, mechanical structures for retaining such elements, and optical and electrical interconnections.

Optical transmitters and receivers can be modularized. As illustrated in FIG. 1, an optical transceiver module 10 can includes a housing 12 in which the above-described opto-electronic and optical elements are retained. In a forward end of housing 12, a multiple-fiber push-on (MPO) connector 14 retains the ends of a number of parallel optical fibers 16. Although not shown in FIG. 1 for purposes of clarity, the other ends of fibers 16 are coupled to optical or opto-electronic elements within housing 12. A mating connector 18 can be plugged into optical transceiver module 10. When mating connector 18 is plugged into optical transceiver module 10 (indicated by the arrows), mating connector 18 is not only mechanically connected or mated with transceiver module 10 but the ends of optical fibers 16 are also optically coupled with the ends of optical fibers 20 of mating connector 18.

To promote secure mechanical connection between mating connector 18 and optical transceiver module 10, MPO connector 14 has two substantially cylindrical pins 22 that engage correspondingly shaped bores (not shown) in mating connector 18. As further illustrated in FIG. 2A, each of pins 22 has an elongated shaft 24 and a groove 26. To assemble pins 22 with MPO connector 14, pins 22 are inserted into bores (not shown) in MPO connector 14, and a retaining plate 30 is snapped into grooves 26 in the manner illustrated in FIGS. 3-4. (MPO connector 14 is not shown in FIGS. 3-4 for purposes of clarity.) Referring again to FIG. 1, when pins 22 are assembled with MPO connector 14 in this manner, retaining plate 30 abuts the rearward wall of MPO connector 14. To facilitate the snapping action, grooves 26 have a trough-shaped or curving contour, the retaining plate may have a relief along the sides of the slots to capture the pin (not shown), and both retaining plate 30 and grooves 26 must be made to close tolerances. If mating dimensions are looser, it may be easier to snap retaining plate 30 into grooves 26, but retaining plate 30 may not retain pins 22 as securely. If mating dimensions are tighter, retaining plate 30 may hold pins 22 more securely, but it may be more difficult to snap retaining plate 30 into grooves 26.

The assembled MPO connector 14 is mounted in housing 12 in an orientation in which the ends of pins 22 abut an interior wall 28 of housing 12. Retaining plate 30 inhibits pins 22 from being withdrawn from the forward end of MPO connector 14. The abutting arrangement between the ends of pins 22 and wall 28 inhibits pins 22 from being pushed further into housing 12. Nevertheless, if care is not taken when mating connector 18 is plugged into optical transceiver module 10 and unplugged from optical transceiver module 10, it is possible for pins 22 to be dislodged from their positions in MPO connector 14. Also, it is possible that while mating connector 18 and optical transceiver module 10 are connected, a force that is applied to one of mating connector 18 and optical transceiver module 10 can cause what is sometimes referred to in the art as "wiggle," in which the ends of optical fibers 16 in MPO connector 14 move out of optical alignment with the ends of optical fibers 20 of mating connector 18. Such wiggle results in the optical power coupled through connectors 14 and 18 to fluctuate up and down.

Pin configurations other than that described above are known. For example, as illustrated in FIG. 2B, a pin 32 has an elongated shaft 34 and a head 36. Head 36 has a larger diameter than shaft 34. Head 36 serves a function similar to that of above-described groove 26 by inhibiting pin 32 from being withdrawn from the forward end of an MPO connector.

SUMMARY

Embodiments of the present invention relate to an optical connector that includes a connector housing, a retaining plate, a first pin and a second pin. The connector housing has a first bore extending between a rearward end of the connector housing and a forward end of the connector housing. The connector housing similarly has a second bore extending between the rearward end of the connector housing and the forward end of the connector housing. The retaining plate has a central opening with a first side and a second side. The first side of the central opening has a first notch, and the second side of the central opening, opposite the second side, has a second notch. The first pin has an elongated shaft with a first groove. The first pin extends through the first notch perpendicularly to the retaining plate. The first groove is engaged in the first notch. The first pin extends through the first bore. Similarly, the second pin has an elongated shaft with a groove. The second pin extends through the second notch perpendicularly to the retaining plate. The second groove is engaged in the second notch. The second pin extends through the second bore.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
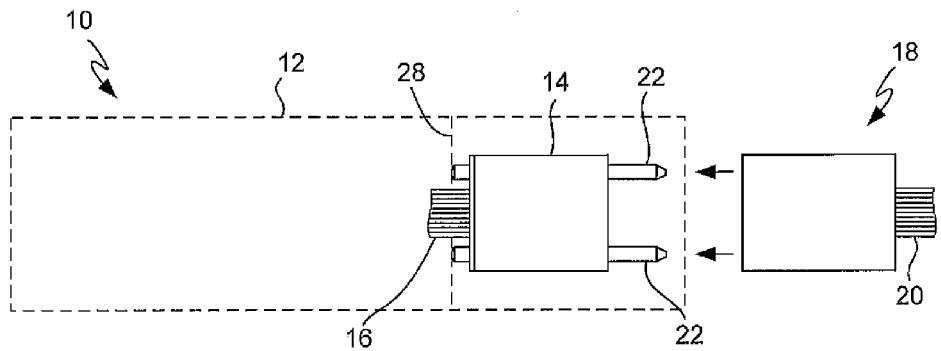
FIG. 1 is a generalized top plan view of an optical connector in an optical transceiver module and a mating connector, in accordance with the prior art.
Figure 2A:
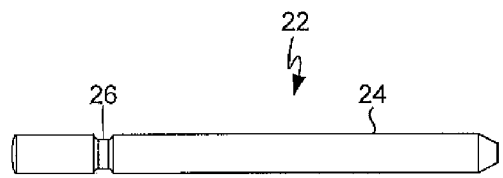
FIG. 2A is a side elevation view of a guide pin of the prior art connector of FIG. 1.
Figure 2B:
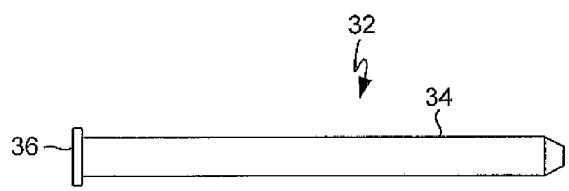
FIG. 2B is a side elevation view of another prior art guide pin.
Figure 3:
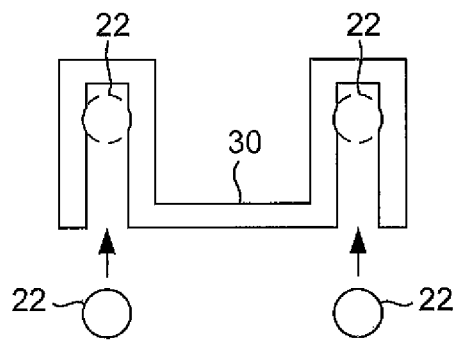
FIG. 3 is a side elevation view of a retaining plate of the prior art connector of FIG. 1, showing the mounting of the guide pins.
Figure 4:
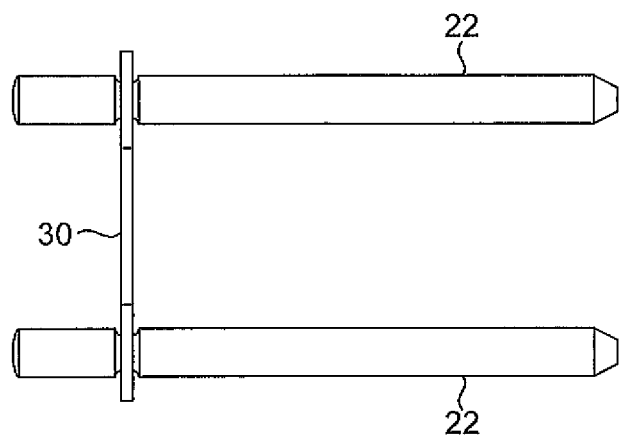
FIG. 4 is a top plan view showing the guide pins mounted in the retaining plate of FIG. 3.
Figure 5:
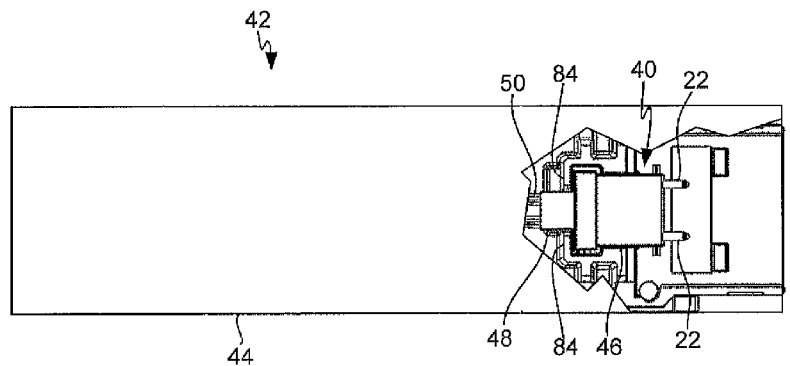
FIG. 5 is a top plan view, partially cut away, of an optical transceiver module having a connector, in accordance with an exemplary embodiment of the present invention.

As illustrated in FIG. 5, in an illustrative or exemplary embodiment of the invention, a connector 40 is included in an optical transceiver module 42. Although in the exemplary embodiment connector 40 is included in optical transceiver module 42, in other embodiments (not shown) such a connector can be included in any other suitable type of optical communications module or other optical device. Connector 40 is mounted in the forward end of the module housing 44 of optical transceiver module 42 to facilitate connection of a conventional mating connector (not shown).

Figure 6:
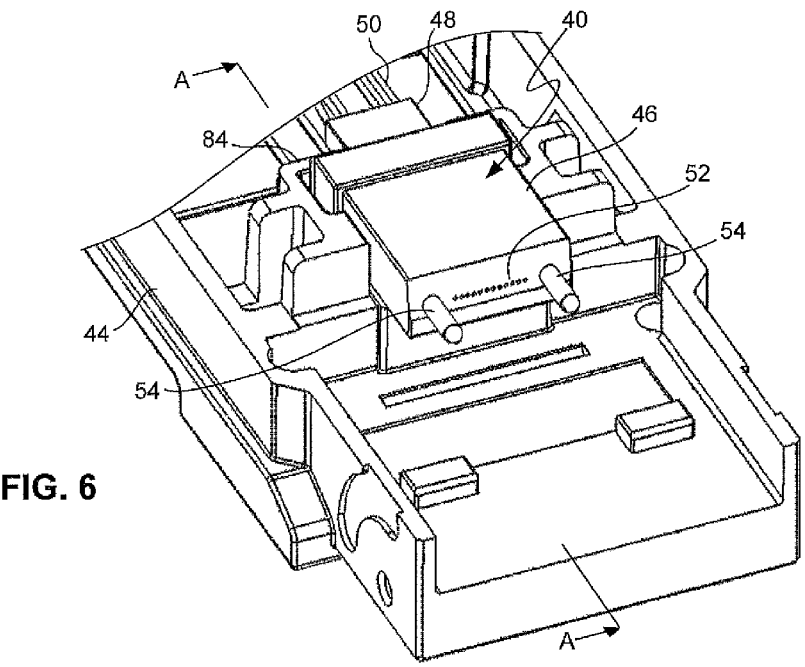
FIG. 6 is a front perspective view of a portion of FIG. 5, showing the connector.
Figure 7:
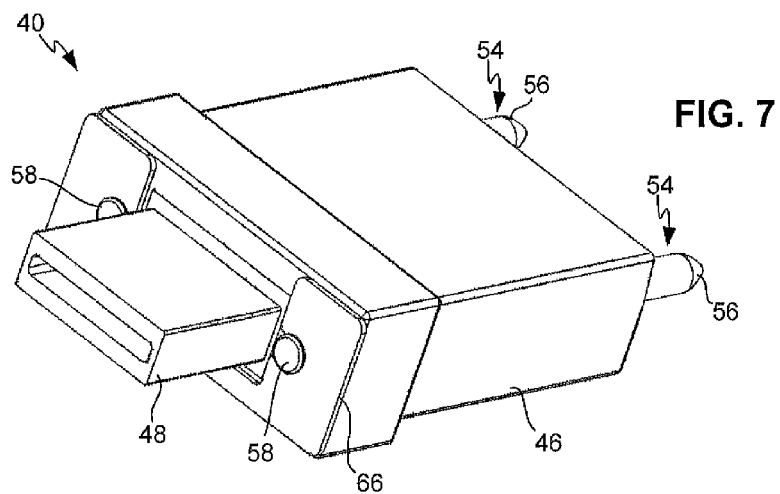
FIG. 7 is a rear perspective view of the connector of FIGS. 5-6.

As illustrated in FIGS. 6-7, connector 40 includes a ferrule or connector housing 46. An elastomeric strain relief 48 serves as a retaining block to retain an array of optical fibers 50 (FIG. 6) in connector housing 46. Optical fibers 50 (not shown in FIG. 7 for purposes of clarity) extend through strain relief 48 and through connector housing 46 from a rearward end of connector housing 46 to a forward end of connector housing 46. The extreme ends of optical fibers 50 define an optical array port 52 (FIG. 6) at the forward end of connector housing 46. Thus, in an embodiment in which there are, for example, twelve optical fibers 50, optical array port 52 is defined by the extreme ends of the twelve optical fibers 50. In other embodiments, there can be any number of optical fibers 50.

Figure 8:
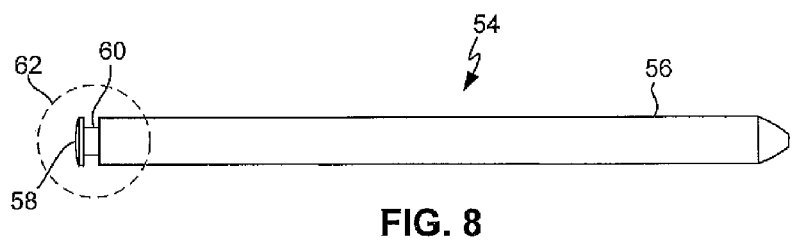
FIG. 8 is a side elevation view of a guide pin of the connector of FIGS. 5-7.
Figure 9:
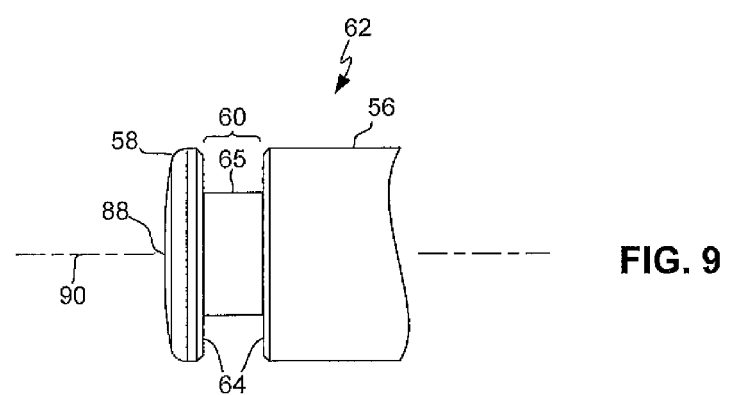
FIG. 9 is an enlargement of a portion of FIG. 8.

Two guide pins 54 extend through connector housing 46 from the rearward end to the forward end. As further illustrated in FIGS. 8-9, each of guide pins 54 has an elongated, generally cylindrical shaft comprising a barrel 56, a head 58 and a groove 60. The tip of barrel 56 has a generally conical shape. An enlarged portion 62 of FIG. 8 is shown in FIG. 9. As illustrated in FIG. 9, groove 60 has a rectangular profile. That is, groove 60 has two parallel, flat sidewalls 64 and a flat bottom 65. However, in other embodiments, rather than two flat sidewalls 64, a single such flat sidewall on the side of the groove adjacent the head of the pin would be suitable.

Figure 10:
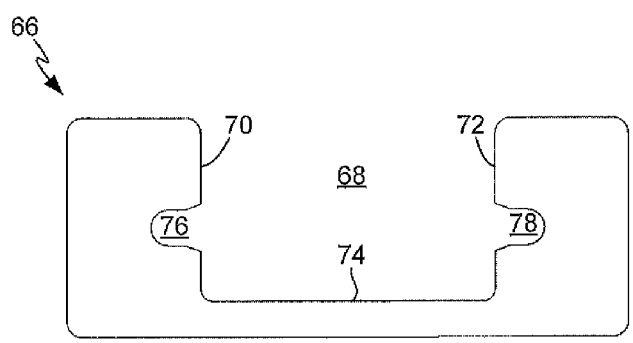
FIG. 10 is a side elevation view of the retaining plate of the connector of FIGS. 5-7.

As illustrated in FIG. 7, guide pins 54 engage a retaining plate 66. Retaining plate 66 abuts the rearward end of connector housing 46. Retaining plate 66 can be made of, for example, sheet metal. As further illustrated in FIG. 10, retaining plate 66 has a central opening 68. Central opening 68 has first side 70, a second side 72 opposite and parallel to first side 70, and a third side 74. First side 70 has a first notch 76, and second side 72 has a second notch 78. Third side 74 connects first and second sides 70 and 72 and is perpendicular to first and second sides 70 and 72. Third side 74 has no notch. Note that central opening 68 has no fourth side, i.e., central opening 68 has exactly three sides, giving retaining plate 66 a "U" shape. Stated another way, the arms of the "U" shape have first and second notches 76 and 78.

Figure 11:
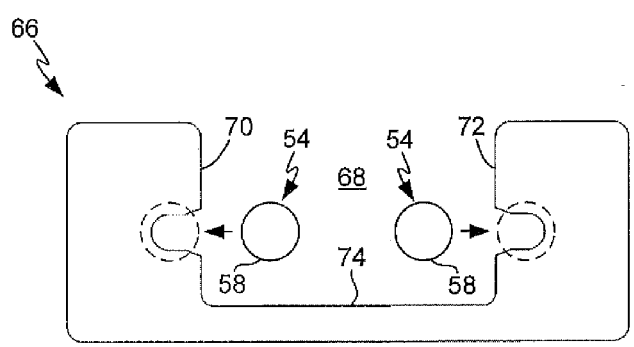
FIG. 11 is similar to FIG. 10, illustrating assembling the guide pins and retaining plate.
Figure 12:
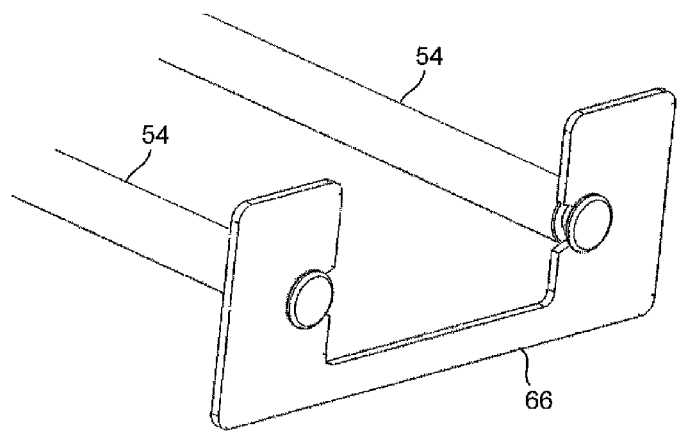
FIG. 12 is a perspective view, illustrating the assembled guide pins and retaining plate.

As illustrated in FIGS. 11-12, retaining plate 66 and guide pins 54 are assembled by engaging grooves 60 in notches 76 and 78. In FIG. 11, guide pins 54 are shown in broken line engaged with retaining plate 66. As further illustrated in FIGS. 12-13, in this engaged position guide pins 54 extend perpendicularly to retaining plate 66 (through notches 76 and 78). That is, groove 60 of one of guide pins 54 is engaged in notch 76, and groove 60 of the other of guide pins 54 is engaged in notch 78. Note that as groove 60 has a rectangular profile, its two parallel flat sidewalls 64 (FIG. 9) abut or lie flat against the flat surfaces of retaining plate 66.

Figure 13:
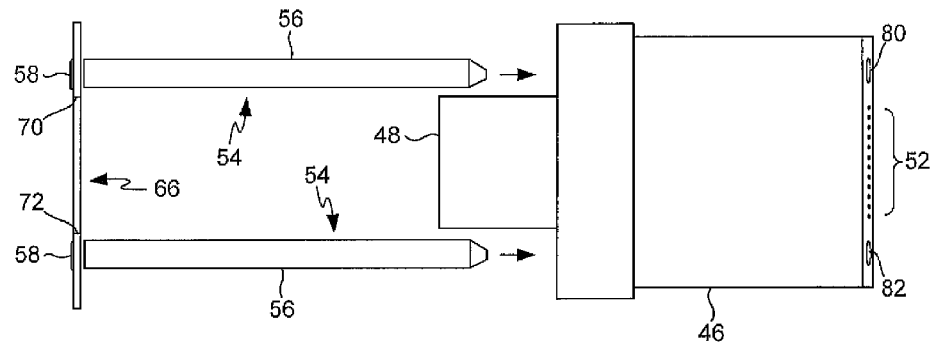
FIG. 13 is a top plan view, illustrating assembling the guide pins, retaining plate and ferrule of the connector of FIGS. 5-7.
Figure 14:
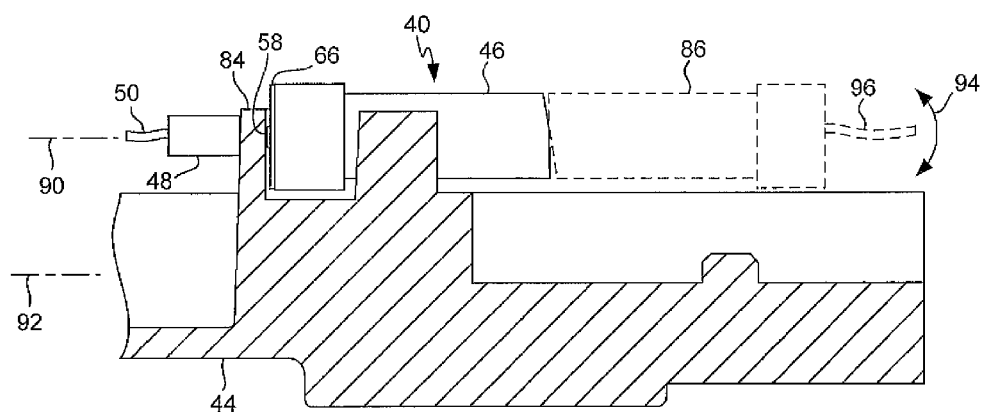
FIG. 14 is a sectional view taken on line A-A of FIG. 6.

The sub-assembly comprising retaining plate 66 and guide pins 54 is assembled with connector housing 46 by inserting the tips of guide pins 54 into respective bores 80 and 82 in connector housing 46, as indicated by the arrows in FIG. 13. Note that although only the forward ends of bores 80 and 82 are shown in FIG. 13, the tips of guide pins 54 are inserted into the rearward ends of bores 80 and 82 in the rearward end of connector housing 46. The forward ends of bores 80 and 82 are visible in FIG. 13 because the forward end of connector housing 46 is angled, as shown in FIG. 14. Such angling of the forward end of connector housing 46 and thus of optical array port 52 inhibits undesirable reflection of optical signals. When guide pins 54 are fully inserted, retaining plate 66 abuts the rearward end of connector housing 46, and the tips of guide pins 54 protrude from the forward end of connector housing 46, thereby defining the fully assembled connector 40 (see FIGS. 5-7 and 14). The barrels 56 of guide pins 54 thus extend completely through connector housing 46. Note that strain relief 48 extends through central opening 68 in retaining plate 66. Strain relief 48 abuts sides 70 and 72 of central opening 68 adjacent guide pins 54. (For purposes of clarity, optical fibers 50 are not shown in FIG. 13.)

Note that when grooves 60 of guide pins 54 are engaged with retaining plate 66 in the above-described manner, and guide pins 54 are restrained from moving laterally by bores 80 and 82 of connector housing 46, retaining plate 66 cannot fall off inadvertently in any direction. Furthermore, the one of flat sidewalls 64 that is nearest or adjacent to head 58 is contacted along three sides (approximately ¾ of the area of sidewall 64), thereby enhancing the retaining strength of guide pin 54. More specifically, the retaining strength is enhanced by increasing the pullout forces that would be needed to pull guide pin 54 out of connector housing 46 from the rearward end toward the forward end of connector housing 46. Note that as each groove 60 has a flat profile on its side that is nearest head 58, this flat sidewall 64 abuts retaining plate 66 and further enhances the retaining strength of guide pin 54.

Once assembled in the above-described manner, connector 40 can be mounted in module housing 44, as shown in above-described FIGS. 5-6. But for connector 40, module housing 44 and other aspects of transceiver module 42 can be conventional. As such conventional aspects are well understood by persons skilled in the art; they are accordingly not described in further detail herein. Nevertheless, it can be noted that transceiver module 42 can include, for example, opto-electronic light sources, such as lasers, and opto-electronic light detectors coupled to optical fibers 50 in a conventional arrangement within module housing 44.

As illustrated in FIG. 14, when connector 40 is mounted in module housing 44, heads 58 of guide pins 54 abut an internal wall 84 of module housing 44. Guide pins 54 cannot be withdrawn from connector housing 46 (e.g., by grasping their tips and urging them in a direction from the rearward end toward the forward end of connector housing 46) because retaining plate 66 abuts the rearward end of connector housing 46 and retains guide pins 54 against movement in that direction. Guide pins 54 also cannot be pushed further into connector housing 46 (e.g., by pushing their tips in a direction from the forward end toward the rearward end of connector housing 46) because, as noted above, heads 58 of guide pins 54 abut internal wall 84 of module housing 44.

As also illustrated in FIG. 14, a mating connector 86 can be connected to connector 40 by plugging them together in a conventional manner That is, guide pins 54 can be introduced into corresponding bores (not shown) in mating connector 86. (Other mechanical details of the mating action are well understood by persons skilled in the art and therefore not described herein.) Mating connector 86 can be of a conventional type, such as MPO.

Figure 16:
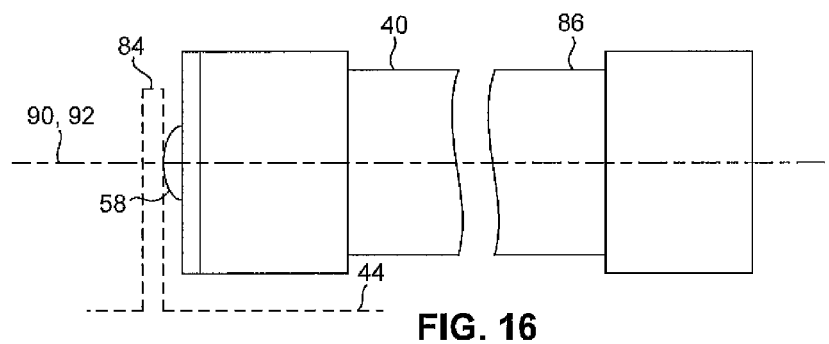
FIG. 16 is similar to FIG. 15.
Figure 17:
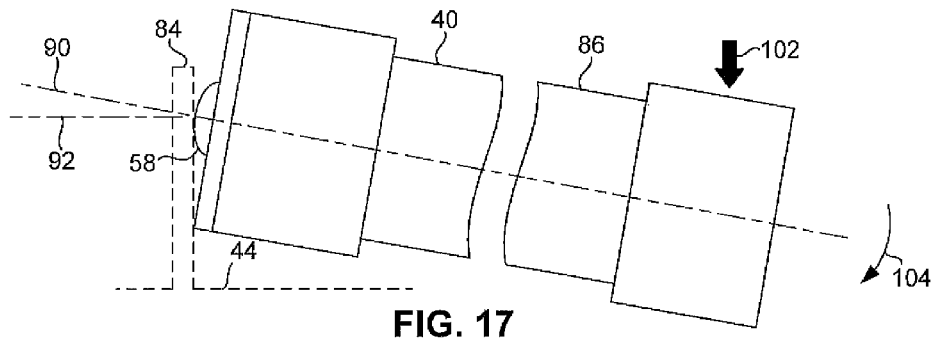
FIG. 17 is similar to FIGS. 15-16.

Referring briefly to FIG. 9, note that head 58 of each guide pin 54 has a domed shape, i.e., is rounded and has an apex 88 at the central or longitudinal axis 90 of pin 54. Referring again to FIG. 14, longitudinal axis 90 of each guide pin 54 is generally parallel with the longitudinal axis 92 of module housing 44. However, if a force in a direction oblique to longitudinal axis 92 is inadvertently applied to mating connector 86 (and thus transferred to connector 40), it can cause the mated connectors 86 and 40 to swing slightly with respect to module housing 44 in the directions indicated by the double-headed arrow 94. Such forces can result, for example, from vibration or from a person inadvertently touching a cable 96 to which mating connector 86 is coupled. In a conventional MPO connector system, such a force can result in what is sometimes referred to as "wiggle" between the mated connectors and attendant partial loss of optical coupling because the MPO connector's flat head abuts the internal wall and inhibits the MPO connector from following the movement of the mating connector. But in the illustrated embodiment, such a force results in significantly less wiggle because the domed head 58 allows connector 40 to rock against internal wall 84 as it follows the movement of mating connector 86. Such rocking of the mated connectors 86 and 40 is illustrated in FIGS. 15-17 in an exaggerated manner for purposes of clarity.

Figure 15:
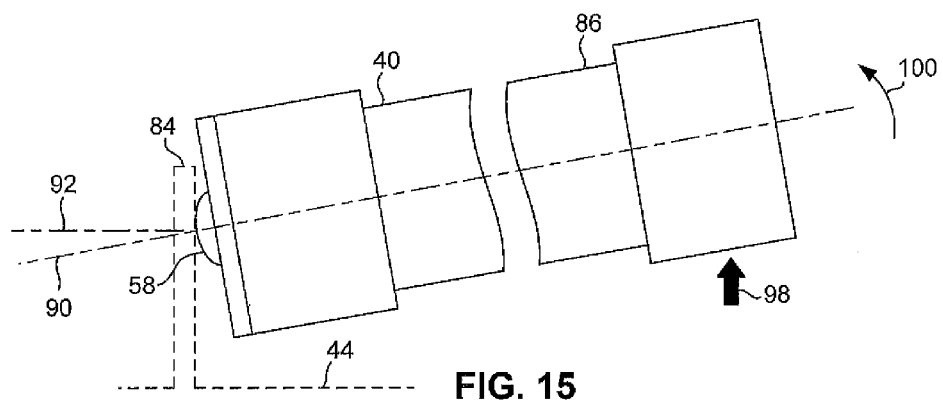
FIG. 15 is a generalized side elevation view illustrating the pivoting action promoted by the rounded guide pin heads of the connector of FIGS. 5-7.

As illustrated in FIG. 15, a force 98 directed upwardly causes the mated connectors 86 and 40 to move in the direction of the arrow 100. Similarly, as illustrated in FIG. 17, a force 102 directed downwardly causes the mated connectors 86 and 40 to move in the direction of the arrow 104. With no force applied, connectors 86 and 40 rest in the position shown in FIGS. 14 and 16, in which longitudinal axis 90 of each guide pin 54 is parallel with longitudinal axis 92 of module housing 44. Optical coupling is better maintained because connector 40 follows or moves along with connector 86 (FIGS. 15 and 17) in this manner. A low-friction coating or other low-friction material can be applied to internal wall 84 or heads 58 to promote the above-described movement. Examples of suitable low-friction coatings include molybdenum disulfide, nickel plating, or carbon films.

Figure 18:
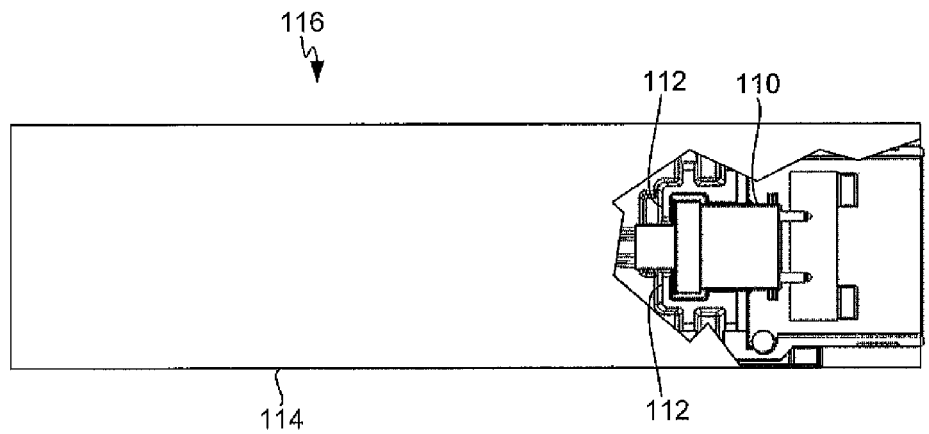
FIG. 18 is similar to FIG. 5, showing an alternative optical transceiver module.
Figure 19:
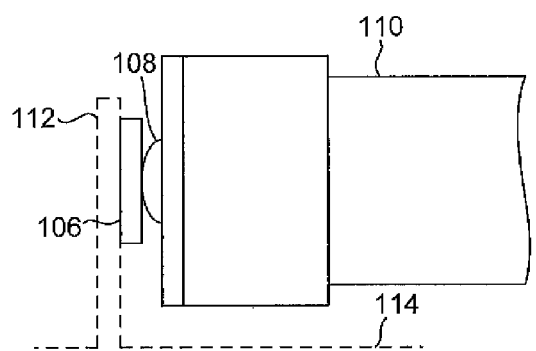
FIG. 19 is a generalized side elevation view illustrating the low-friction pivoting arrangement in the alternative optical transceiver module of FIG. 18.

As illustrated in FIGS. 18-19, in an alternative embodiment a pad 106 or similar structure made of a low-friction material is mounted between the two pin heads 108 of a connector 110 and an internal wall 112 of a module housing 114 of an optical transceiver module 116. Examples of suitable low-friction materials for pads 106 include bearing grade bronze, and plastics such as acetal and high-density polyethylene. Other than the inclusion of pad 106, optical transceiver module 116 and its connector 110 can be the same as above-described optical transceiver module 42 and its connector 40. Thus, in both of the above-described embodiments there is an abutting interface between a pin and an internal wall of a module housing that includes a low-friction material, such as a coating, a pad, etc.

One or more illustrative embodiments of the invention have been described above. However, it is to be understood that the invention is defined by the appended claims and is not limited to the specific embodiments described.

What is claimed is:

1. An optical connector, comprising:
   a connector housing having a first bore extending between a rearward end of the connector housing and a forward end of the connector housing and a second bore extending between the rearward end of the connector housing and the forward end of the connector housing;
   a rigid retaining plate abutting an outside surface of the rearward end of the connector housing, the retaining plate having a central opening with a first side and a second side opposite the first side, the first side having a first notch, the second side having a second notch;
   a first pin having an elongated shaft with a first groove in a first end of the first pin forming a first head, the first pin extending through the first notch perpendicularly to the retaining plate with an inside surface of the first head abutting an outside surface of the retaining plate, the first groove engaged in the first notch, the first pin extending through the first bore; and
   a second pin having an elongated shaft with a groove in a first end of the second pin forming a second head, the second pin extending through the second notch perpendicularly to the retaining plate with an inside surface of the second head abutting an outside surface of the retaining plate, the second groove engaged in the second notch, the second pin extending through the second bore.

2. The optical connector of claim 1, wherein the central opening has exactly three sides, a third side extending between the first and second sides.

3. The optical connector of claim 1, wherein:
   the first groove has a flat sidewall forming the inside surface of the first head abutting a flat surface of the retaining plate; and
   the second groove has a flat sidewall forming the inside surface of the second head abutting a flat surface of the retaining plate.

4. The optical connector of claim 1, wherein:
   the first groove has a rectangular profile with two parallel flat sidewalls, a first of the parallel flat sidewalls forming the inside surface of the first head; and
   the second groove has a rectangular profile with two parallel flat sidewalls, a first of the parallel flat sidewalls forming the inside surface of the second head.

5. The optical connector of claim 4, wherein:
   the first pin has a first barrel extending from the second of the two parallel flat sidewalls, the first barrel extends through the first bore between the rearward end of the connector housing and the forward end of the connector housing, and no portion of the first pin has a diameter exceeding a diameter of the first barrel; and the second pin has a first barrel extending from the second of the two parallel flat sidewalls, the second barrel extends through the second bore between the rearward end of the connector housing and the forward end of the connector housing, and no portion of the second pin has a diameter exceeding a diameter of the second barrel.

6. The optical connector of claim 5, wherein:
the first head has a diameter equal to a diameter of the first barrel; and
the second head has a diameter equal to a diameter of the second barrel.

7. The optical connector of claim 1, wherein the connector, retaining plate and first and second pins are included in an optical communications module.

8. The optical connector of claim 7, wherein the optical communications module is an optical transceiver module.

9. The optical connector of claim 7, wherein the central opening has exactly three sides, a third side extending between the first and second sides.

10. The optical connector of claim 7, wherein:
the first head has a domed shape with an apex abutting an interior wall of the optical communications module; and
the second head has a domed shape with an apex abutting the interior wall of the optical communications module.

11. The optical connector of claim 10, wherein a low-friction coating is disposed on at least one of the first head, the second head, and the interior wall.

12. The optical connector of claim 10, wherein:
a first portion of a low-friction material is interposed between the first head and the interior wall of the optical communications module; and
a second portion of the low-friction material is interposed between the second head and the interior wall of the optical communications module.

13. An optical connector, comprising:
a connector housing having a first bore extending between a rearward end of the connector housing and a forward end of the connector housing and a second bore extending between the rearward end of the connector housing and the forward end of the connector housing;
a rigid retaining plate abutting an outside surface of the rearward end of the connector housing, the retaining plate having a central opening with a first side and a second side, the first side having a first notch, the second side having a second notch;
a first pin having an elongated shaft with a first groove in a first end of the first pin forming a first head, the first pin extending through the first notch perpendicularly to the retaining plate, the first groove engaged in the first notch, the first groove having a flat sidewall forming an inside surface of the first head abutting the retaining plate, the first pin extending through the first bore;
a second pin having an elongated shaft with a second groove in a first end of the second pin forming a second head, the second pin extending through the second notch perpendicularly to the retaining plate, the second groove engaged in the second notch, the second groove having a flat sidewall forming an inside surface of the first head abutting the retaining plate, the second pin extending through the second bore;
a first abutting interface between the first head of the first pin and a module housing wall including a low-friction material; and
a second abutting interface between the second head of the second pin and a module housing wall including the low-friction material.

14. The optical connector of claim 13, wherein:
the first head has a diameter equal to a diameter of the first barrel; and
the second head has a diameter equal to a diameter of the second barrel.

15. The optical connector of claim 13, wherein the connector, retaining plate and first and second pins are included in an optical communications module.

16. The optical connector of claim 15, wherein the optical communications module is an optical transceiver module.

17. The optical connector of claim 15, wherein:
the first head has a domed shape with an apex abutting an interior wall of the optical communications module; and
the second head has a domed shape with an apex abutting the interior wall of the optical communications module.

18. The optical connector of claim 15, wherein the central opening has exactly three sides, a third side extending between the first and second sides.

19. The optical connector of claim 15, wherein the low-friction material comprises a coating disposed on at least one of the first head, the second head, and the interior wall.

20. The optical connector of claim 15, wherein the low-friction material comprises a pad having a first portion interposed between the first head and the interior wall of the optical communications module and a second portion interposed between the second head and the interior wall of the optical communications module.

* * * * *